United States Patent
Arvisais

[19]

[11] Patent Number: 5,905,940
[45] Date of Patent: May 18, 1999

[54] VIDEO COMMUNICATION METHOD

[76] Inventor: Georges J. Arvisais, 515 Rang Ste-Therese, St-Remi-de-Napierville, Quebec, Canada, J0L 2L0

[21] Appl. No.: 08/795,715

[22] Filed: Feb. 4, 1997

[51] Int. Cl.⁶ .................................................. H04N 7/173
[52] U.S. Cl. ................................... 455/2; 348/3; 348/12; 455/5.1; 386/46; 386/83
[58] Field of Search .................................... 348/7, 12, 13, 348/10, 1, 2, 3; 455/4.2, 5.1, 6.2, 6.3, 2; 386/125, 126, 46, 83; H04N 7/16, 7/173

[56] References Cited

U.S. PATENT DOCUMENTS

| | | | |
|---|---|---|---|
| 4,769,833 | 9/1988 | Farleigh et al. | 348/13 |
| 4,949,187 | 8/1990 | Cohen | 348/3 |
| 5,309,248 | 5/1994 | Polidori | 358/335 |
| 5,510,829 | 4/1996 | Sugiyama et al. | 348/14 |
| 5,526,035 | 6/1996 | Lappington et al. | 348/13 |
| 5,541,852 | 7/1996 | Eyuboglu et al. | 364/14 |
| 5,550,754 | 8/1996 | McNelley et al. | 364/514 |
| 5,555,017 | 9/1996 | Landante et al. | 348/15 |
| 5,557,317 | 9/1996 | Nishio et al. | 348/7 |
| 5,557,320 | 9/1996 | Krebs | 348/13 |
| 5,570,355 | 10/1996 | Dail et al. | 370/60 |
| 5,646,603 | 7/1997 | Nagata et al. | 386/83 |
| 5,784,522 | 7/1998 | Yamamura | 386/46 |
| 5,790,172 | 8/1998 | Imanaka | 348/3 |

*Primary Examiner*—Chris Grant
*Attorney, Agent, or Firm*—Helfgott & Karas, P.C.

[57] ABSTRACT

A method for sending and receiving videos (pre-recorded as well as live) from the home or office making full use of home entertainment electronic devices and using digital broadband switching and transmission networks, to interconnect the sending "up-stream" and the receiving "down-stream" of the television subscription service provider (TSSP). The video can also be sent from public kiosks set-up for that purpose.

2 Claims, 4 Drawing Sheets

VIDEO COMMUNICATION METHOD

The present invention relates generally to telecommunication methods and, more specifically, to a method which makes video telecommunicating more convenient.

BACKGROUND OF THE INVENTION

Today, the video camera recorder (Camcorder) has revolutionized how people make home movies. Over the years people have evolved from the use of photo sensitive films developed for projection onto movie screens, to the use of electronic recordings shown on television sets. The television evening news regularly show scenes of floods, hurricanes and other such happenings that have been recorded by amateurs using video cameras. By means of a small and easy to use video camera anyone can replay on their video cassette recorder (VCR) and television set the most trivial to the most significant of events.

Videos are quickly becoming a very important medium of communications. Job applicants resort to submitting their curriculum vitea on videos. New songs on the Hit Parade list have their own promotional videos. "How to operate" videos are now provided with the purchase of home appliances for instance. Television feature documentaries promote the availability of their videos.

Today most North American households have VCR's. Nearly 20 percent have Camcorders. Videos, as a medium of communications have become a pervasive growth phenomena.

Surprisingly, and in spite of today's technology, these electronically recorded videos must be forwarded by mail and courier services if they are to be sent anywhere. There is no electronic communication service available to ferry these videos across the country and around the world.

There is a need to link all these households with an electronic highway for videos. It should be possible to access such an electronic highway through one's TSSP. Once on this highway, it should be possible to reach the desired recipient through the latter's TSSP.

Known telecommunication services were developed and tailormade for the written word (telegraph and telex), for pictures (facsimile) and for the spoken word (telephone). Today, there is a need for a telecommunication service which is tailormade for videos.

Existing public telecommunication services have failed to provide a convenient and economical solution.

Problems in the Art 1-1 Bandwidth

Although videos are often of shorter duration, they require the same standard 6 megahertz broadcast channel bandwidth as normal television programming seen on television. It follows that the inability to come up with a satisfactory videophone over the years is in part due to the large bandwidth required for the satisfactory transmission of video over the public telephone network.

In theory, existing analogue cable televison would have the necessary bandwidth for the transmission of videos. However, in practice, it does not have much spare channel capacity to either receive or send videos.

Although the direct-to-home satellite system (another TSSP) could allow for receiving videos, in practice it only has a normal telephone line as an up-stream link which would not make possible the sending of videos via the satellite system.

For its part, the microwave multipoint distribution systems (MMDS), the new 2.5 gigahertz analogue wireless cable television, has a very limited channel capacity for receiving videos but could be used to send videos from rural areas.

As for the proposed video dial tone networks (which would permit electronic delivery of movies from the video store) they could also be used to receive videos. However, the telephone companies (the creators of such services) are only planning on providing bandwidth in the receive direction. It could not therefore be used to send videos in its currently planned format.

1-2 Public broadband switching network

The necessary interconnecting network, to handle video traffic between TSSPs, does not exist. There is no countrywide public switched broadbband network (PSBN). Even the Internet will require a PSBN to adequately handle its own video requirements.

1-3 Video address

There exists a need to provide a unique address for forwarding videos to their destination and customers of TSSP for their part already have unique addresses within their network but the TSSP per se need unique addresses.

Known solutions 2-1 Bandwidth

Digital transmission providing better quality television signals is now a reality. This has allowed the introduction of digital video compression which can currently cram 8 to 10 video programs onto the standard 6 megahertz of bandwidth. Digital wireless cable, local multipoint communication systems (LMCS), will have the necessary bandwidth and channel capacity to receive and send videos once they become operational sometime in the future. It is anticipated that the cable television companies will begin at least a partial conversion to digital operation within the next 2 to 3 years, making them capable of receiving and sending videos.

The telephone companies can be expected to eventually upgrade their one way video-dial-tone type service to allow for the sending of videos as well.

2-2 Public switched broadband network

The telephone companies are now introducing new digital broadband networks which are based on the asynchronous transfer mode (ATM) for broadband integrated services digital network (B-ISDN).

Related patents

U.S. Pat. No. 5,309,248 to Polidori discloses a system for the simultaneous vision of video pictures reproduced by a transmitting video recorder and a receiving video recorder using a telephone line to extend all commands to the receiving video recorder, which is not a real time video transmission.

U.S. Pat. No. 5,057,932 to Lang discloses an audio/video transceiver apparatus including microwave transceiver means. This is an improved video recorder/transceiver with expanded functionality. It does not possess the communications capabilities which are needed.

Canadian patent # 2,087,434 to Press et al. discloses a companion to a facsimile machine that will transfer and receive data on a floppy disk, hard disk, magnetic tape or optical disk. The telephone line used by this apparatus is the same one the user normally has his facsimile machine connected to. This is strictly a narrowband system.

Canadian patent # 2,088,507 to Trent discloses a method and apparatus for image data processing for transmission along telephone lines. Again, this is strictly a narrowband application.

SUMMARY OF THE INVENTION

The present invention overcomes the above shortcomings.

Accordingly, an object of the present invention is to provide a method for easy and convenient transmission of videos.

In accordance with another object of the invention there is provided a method for transmission of videos making use of existing and emerging telecommunication systems.

In accordance with still another object of the present invention there is provided a method for electronically carrying videos across the country and around the world.

In accordance with yet another object of the present invention there is provided a method for transmitting videos by means of both the up-stream and down-stream segments of television subscription service providers (TSSP) from one video recorder to another, comprising the steps of: a) seizing an idle up-stream channel; b) entering a destination number; c) sending a call signal to a TSSP; d) extending the call signal via a digital broadband network if the destination is hooked up to a TSSP different from the sender's; e) selecting a down-stream channel at the destination; f) tuning-in the selected down-stream channel at the destination; g) turning on a video recorder for recording at the destination; h) triggering a play back mode at the sender's video recorder to start a transmission; i) triggering a call billing signal at the TSSP; j) digitizing, encoding and encrypting the transmission at the sender's; k) de-digitizing, de-encoding and de-encrypting the transmission at the destination; l) initiating at the sender's of a call clearing signal at the end of the transmission; m) triggering the call billing end signal at the TSSP; and n) initiating a clear confirmation signal from the destination; wherein a video recording is transferred from the sender to the destination electronically via the TSSP.

Further objects and advantages of the present invention will be apparent from the following description, reference being made to the accompanying drawings wherein preferred embodiments of the invention are clearly shown.

BRIEF DESCRIPTION OF THE DRAWINGS

The present invention will be further understood from the following description with reference to the drawings in which.

DETAILED DESCRIPTION OF THE DRAWINGS

How it is received

Figure 1:
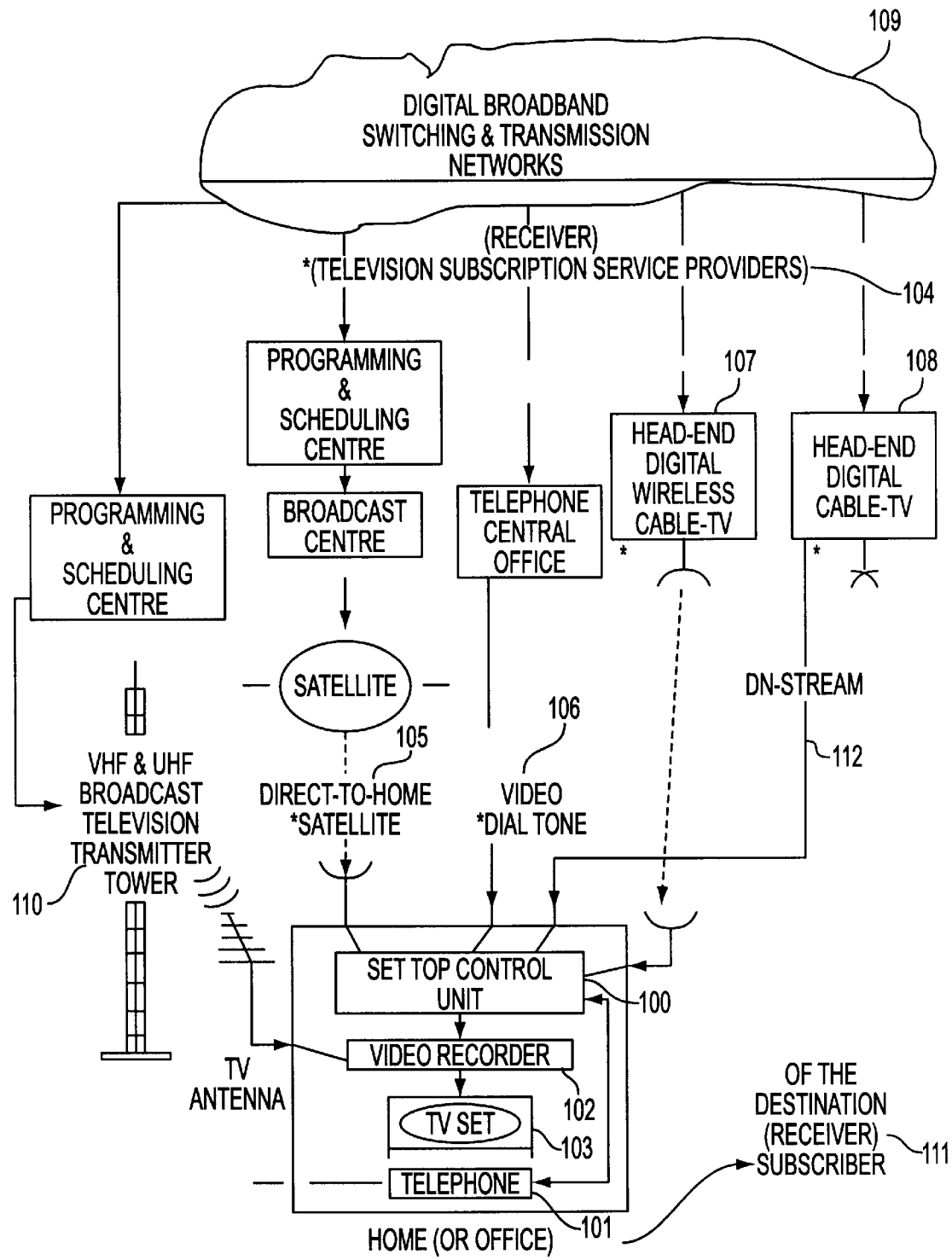
FIG. 1 is a flow chart illustration setting forth the receiving part of a video communication of the invention.

FIG. 1 shows that a video communication will be received via downstream 112 at home or office 111 having a set top control unit 100 and telephone 101, a video recorder 102 and a television set 103. The majority of North American homes already have these home electronic entertainment devices. Newer models of these devices will incorporate the specific automated features of the video communication service.

The set top control unit 100 will be connected to a TSSP 104 such as: direct-to-home satellite television 105, video-dial-tone 106, digital wireless cable television local multi-point communications systems (LMCS) 107 or digital cable television 108. Most North American households will have access to one or more such TSSP.

The video communication will be received from the TSSP 104 network, which in turn will have received it from the digital broadband switching and transmission networks 109, if the video is being received form another TSSP 104.

An indicator on the set top control unit 100 or on the video recorder 102 will signal when a video communication has been received.

It should be noted that it is also possible to receive a video communication via an existing VHF or UHF television broadcasting station 110 as well as via an analogue cable television or an analogue wireless cable television network. Obviously, it would have to occur when the station is not scheduled for regular programming, such as during the middle of the night. Such a video communication would be available for anyone to record, providing that they were tuned to that channel at that time. Eventually, when these systems are converted to digital operation, it would be possible to piggy-back a video communication delivery service over these channels.

How it is sent

Figure 2:
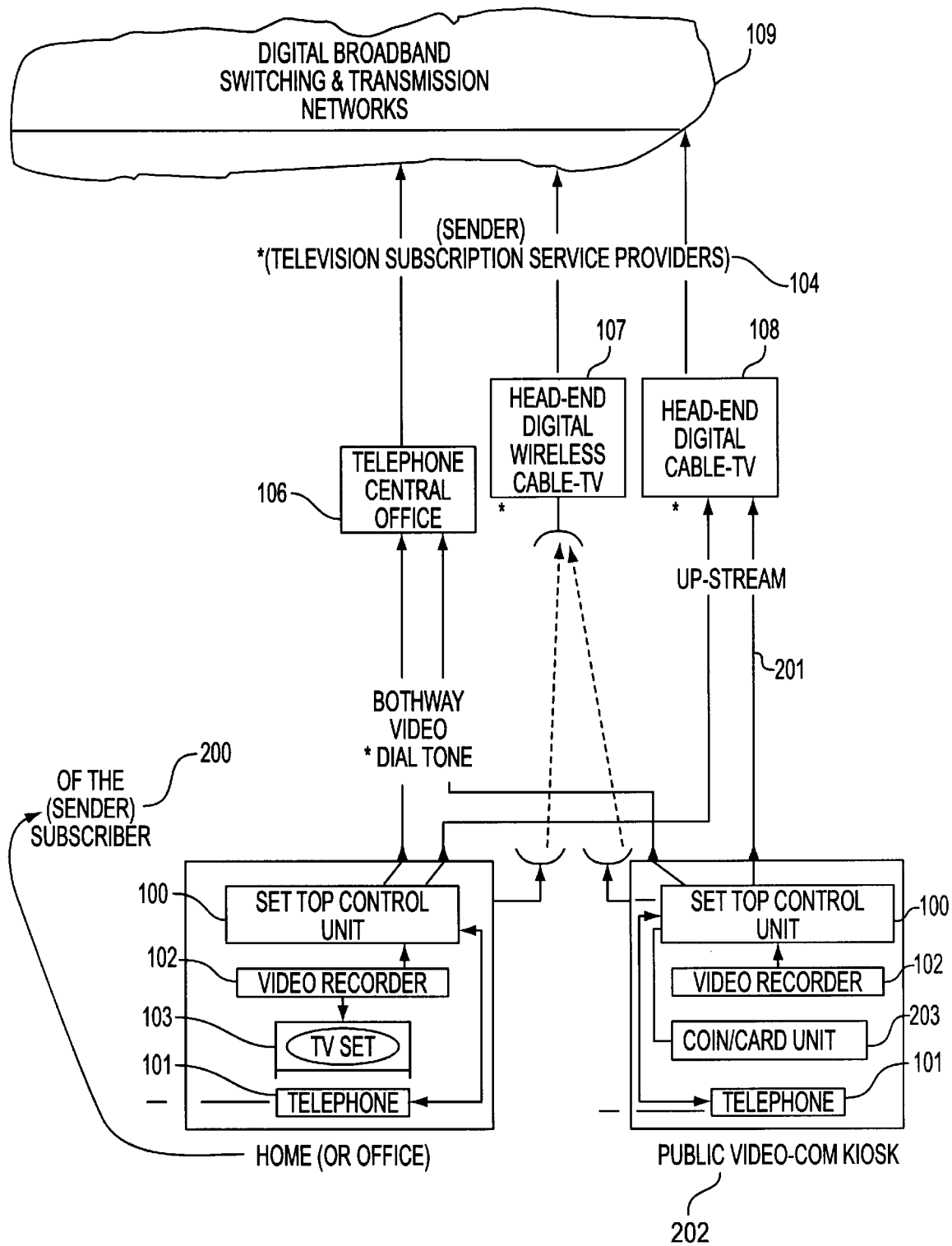
FIG. 2 is a flow chart illustration setting forth the sending part of a video communication of the invention.

FIG. 2 shows that from the home or office 200, the video communication will be sent to one's TSSP 104 via an upstream channel 201, which in turn will be connected to the digital broadband switching and transmission networks 109 to reach the destination (receiver) TSSP 104 and consequently the destination subscriber 111. If the video is not going to another TSSP 104 the connection to the digital broadband switching and transmission is not required.

The video communication will be sent from the sender's video recorder 102. The actual video communication call will be dialed through the sender's set top control unit 100. The sender's TSSP will handle the necessary billing. The number dialed being the destination 111.

Public kiosks

Public kiosks 202 could be set up for people unable or not wiling to send video communications from their home or office. These kiosks could be located next to automated teller banking machine installations.

As in the case of the sending from home or office 200, the kiosk would also use a video recorder and a set top control unit 100 and telephone 101. However, these would have been further modified to handle payments 203. The kiosk would be connected to a digital TSSP 104. It would be possible as well to provide special connections to analogue wireless cable television in rural areas.

Pre-inscribed blank videos

It would be possible to pre-inscribe on blank tapes or disks (or other storage media) the video communication address of the destination 111 subscriber. This could simplify and speed up the sending of these video communications.

The Network

Figure 3:
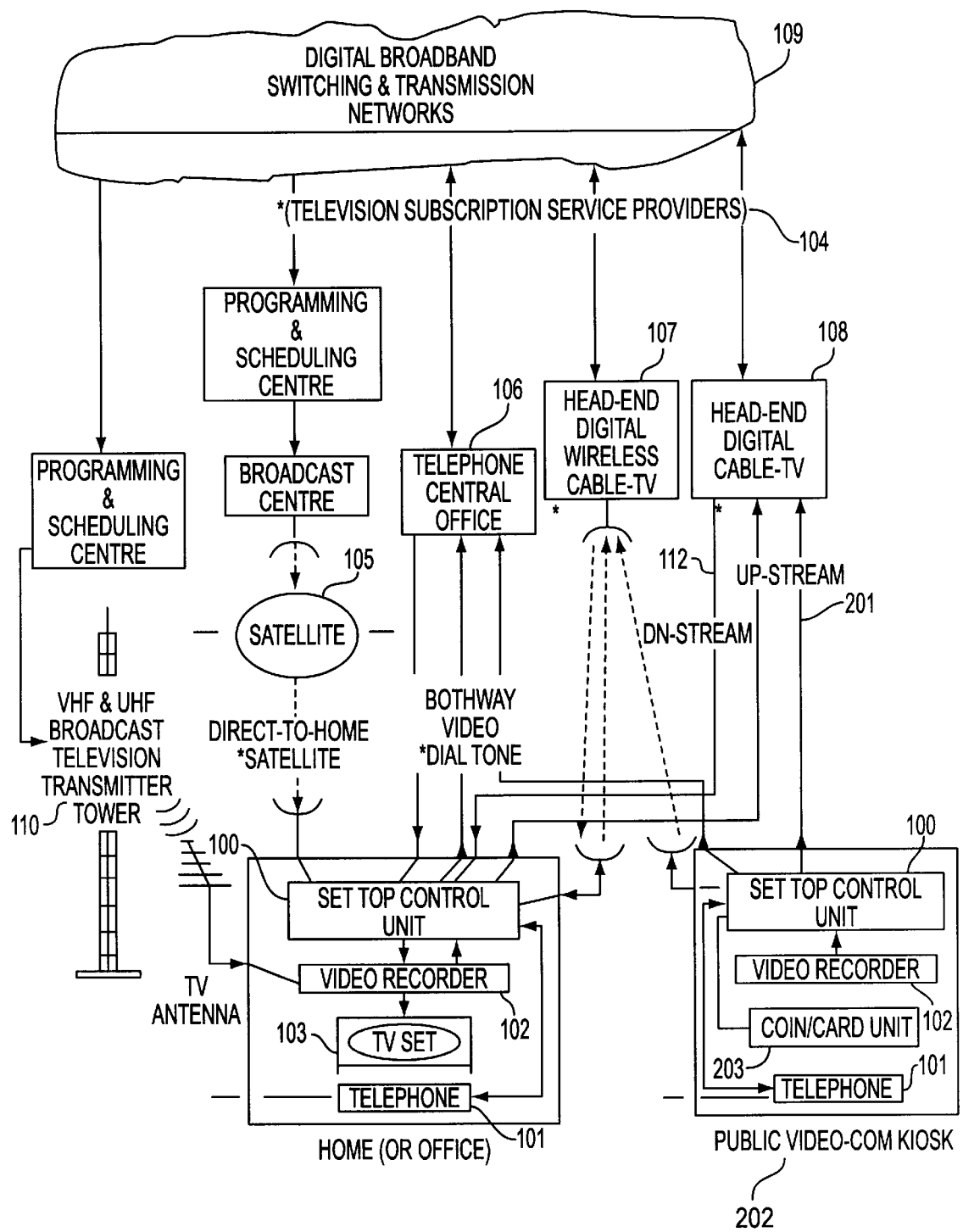
FIG. 3 is a flow chart illustration setting forth the video communication network of the invention.

FIG. 3 shows the overall network used to receive and send video communications. It is the linking of all the TSSP 104 by means of the digital broadband switching and transmission networks 109. It is also the full exploitation of the upstream 201 capabilities of the TSSP 104. It makes full use of home electronic entertainment devices.

TSSP

Any telecommunication company which provides normal entertainment type television signals to the subscriber on a per fee (or subscription) basis can become a link to the video communication network, once it uses digital transmission means. These TSSP 104 have the customer bases for the service. It will be their subscribers that will be the video communication customers who receive and send video communications.

The sender's TSSP 104 whose subscriber originates the video communication will be responsible for monitoring the duration of the call and consequently billing the customer. The sender's TSSP would also be responsible for settling payments due for the use of the broadband and the far end service provider networks.

Steps of a call

Figure 4:
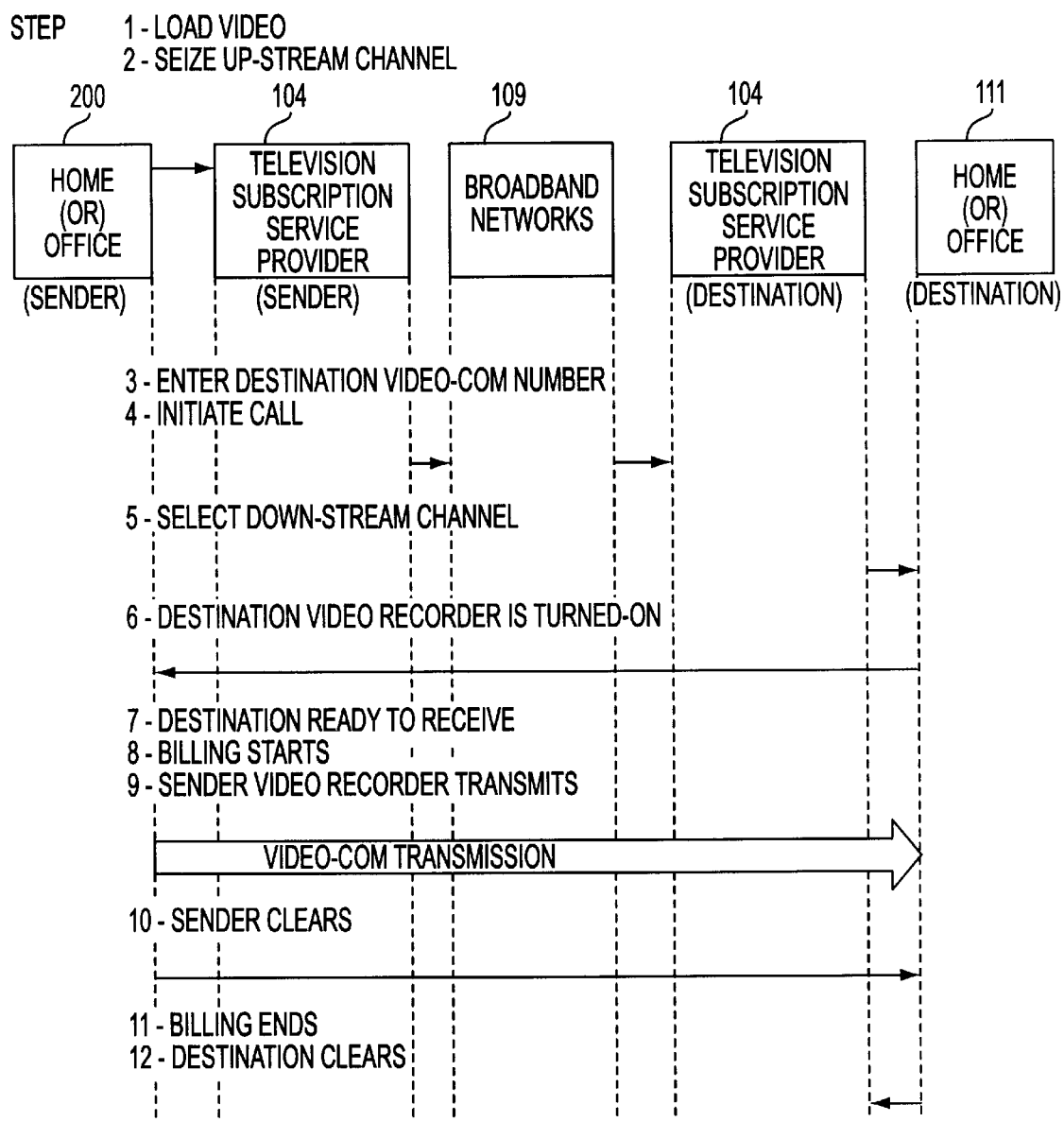
FIG. 4 is a flow chart illustration setting forth the steps of a video communication call of the invention.

The steps of a video communication are shown in FIG. 4. These steps outline, in point form, the setting up and subsequent clearing down of such a call:

1) loading the video into a video recorder;
2) seizing an upstream channel;
3) entering the destination video communication number;
4) initiating the video communication call;
5) connecting the destination downstream channel;
6) turning on the destination video recorder;
7) receiving the destination ready signal;
8) starting billing procedure;
9) sending the video communication;
10) clearing the connection;
11) ending the billing procedure;
12) clearing the destination.

PC Access

Video configured PC's will have access to the video communication network through TSSP 104. They will be able to send and receive video communications.

Live video transmission

The above configured video communication network can be used to carry live video transmission when a video camera is connected.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed is:

1. A method for transmitting videos by means of both up-stream and down-stream segments of television subscription service providers (TSSP) from one video recorder to another, comprising the steps of:

a. loading a video recording on which a destination subscriber's video communication number has been pre-inscribed;

b. seizing an idle up-stream channel;

c. retrieving a pre-inscribed destination number;

d. sending a call signal to a TSSP;

e. extending the call signal via the digital broadband network if a destination is hooked up to a TSSP different from a sender's;

f. selecting a down-stream channel at a destination;

g. tuning-in the selected down-stream channel at a destination;

h. turning on a video recorder for recording at a destination;

i. triggering a play back mode at a sender's video recorder to start a transmission;

j. triggering a call billing signal at the TSSP;

k. digitizing, encoding, and encrypting the transmission at a sender's;

l. de-digitizing, de-encoding, and de-encrypting the transmission at a destination;

m. initiating at the sender's of a call clearing signal at the end of a transmission;

n. triggering a call billing end signal at the TSSP; and o. initiating a clear confirmation signal from the destination;

wherein a video recording is transferred from a sender to a destination via the TSSP.

2. The method of claim 1, whereby means are provided to correct, change or override the inscribed number.

\* \* \* \* \*